(12) United States Patent
Pendray et al.

(10) Patent No.: US 7,262,937 B2
(45) Date of Patent: Aug. 28, 2007

(54) RESPONSIVE AEROELASTIC SLIDER

(75) Inventors: John R. Pendray, Edina, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/797,162

(22) Filed: Mar. 10, 2004

(65) Prior Publication Data

US 2004/0174638 A1 Sep. 9, 2004

Related U.S. Application Data

(63) Continuation-in-part of application No. 10/140,801, filed on May 7, 2002, now Pat. No. 7,064,930.

(60) Provisional application No. 60/293,276, filed on May 23, 2001.

(51) Int. Cl.
*G11B 21/21* (2006.01)
*G11B 21/24* (2006.01)
*G11B 5/60* (2006.01)
*G11B 5/596* (2006.01)
*G11B 17/32* (2006.01)

(52) U.S. Cl. .............. 360/235.1; 360/235.4; 360/235.6; 360/236.3; 360/294.7

(58) Field of Classification Search ............ 360/234.3, 360/235.1–235.9, 236, 236.1–236.9, 237, 360/237.1, 294.7
See application file for complete search history.

(56) References Cited

U.S. PATENT DOCUMENTS

| | | | |
|---|---|---|---|
| 5,710,683 A | 1/1998 | Sundaram | 360/126 |
| 5,853,959 A | 12/1998 | Brand et al. | 430/320 |
| 5,896,243 A | 4/1999 | Koshikawa et al. | 360/234.7 |
| 5,898,542 A | 4/1999 | Koshikawa et al. | 360/234.7 |
| 5,909,340 A | 6/1999 | Lairson et al. | 360/237.1 |
| 5,949,627 A | 9/1999 | Williams et al. | 360/126 |
| 5,991,113 A | 11/1999 | Meyer et al. | 360/75 |
| 6,012,218 A | 1/2000 | Shimizu et al. | 29/603.14 |
| 6,069,770 A | 5/2000 | Cui et al. | 360/236.6 |
| 6,441,385 B1 | 8/2002 | Khlif | 360/235.1 |
| 6,444,138 B1 | 9/2002 | Moon et al. | 216/79 |
| 6,464,892 B2 | 10/2002 | Moon et al. | 216/79 |
| 6,477,019 B2 | 11/2002 | Matono et al. | 360/320 |
| 6,544,863 B1 | 4/2003 | Chong et al. | 438/455 |
| 6,627,909 B2 | 9/2003 | Khlif | 360/235.1 |

(Continued)

OTHER PUBLICATIONS

Iben et al., "Steady-state thermal characteristics of AMR read-write heads used in tape storage drives", IBM J. Res. & Dev. vol. 47 No. 4 pp. 401-414, Jul. 2003.
Weiss, "Wings of Change: Shape-shifting aircraft may ply future skyways", Science News vol. 164 No. 23 pp. 359-365, Dec. 2003.

*Primary Examiner*—Craig A. Renner
(74) *Attorney, Agent, or Firm*—Westman, Champlin & Kelly, P.A.

(57) ABSTRACT

One embodiment of the present invention pertains to a slider that includes a substrate, a transducer tip disposed on the substrate, and a hydrodynamic surface including a responsive aeroelastic deposit. The substrate has a first coefficient of expansion responsive to a stimulus. The transducer tip has having a second coefficient of expansion responsive to the stimulus that is greater than the first coefficient of expansion. The aeroelastic deposit has a third coefficient of expansion responsive to the stimulus that is greater than the first coefficient of expansion. The responsive aeroelastic deposit allows the slider to alter its flight characteristics responsively and elastically to changing operating conditions.

38 Claims, 9 Drawing Sheets

U.S. PATENT DOCUMENTS

| | | |
|---|---|---|
| 6,661,605 B1 * | 12/2003 | Pust et al. .................. 360/126 |
| 6,747,841 B1 * | 6/2004 | Olim et al. ............... 360/235.1 |
| 7,064,930 B2 * | 6/2006 | Serpe et al. ............. 360/236.5 |
| 2002/0145829 A1 | 10/2002 | Gates et al. ............. 360/235.7 |
| 2004/0150916 A1 | 8/2004 | Rao et al. ................ 360/235.8 |
| 2005/0047017 A1 | 3/2005 | Mei et al. ................ 360/234.7 |

* cited by examiner

RESPONSIVE AEROELASTIC SLIDER

CROSS-REFERENCE TO RELATED APPLICATIONS

This application is a continuation-in-part of and claims the benefit of U.S. Non-Provisional application Ser. No. 10/140,801, entitled "Slider Deposits for Control of Pole-to-Disc Spacing", filed May 7, 2002, now U.S Pat. No. 7,064,930 which in turn claims the benefit of U.S. Provisional Application Ser. No. 60/293,276, entitled "Slider Features for Temperature Fly Height Control", filed May 23, 2001, both of which are incorporated by reference herein.

FIELD OF THE INVENTION

The present invention relates generally to sliders, and more particularly but not by limitation, to sliders with responsive aeroelastic properties for lift, pitch, and roll.

BACKGROUND OF THE INVENTION

Data storage systems often include a slider involved in reading from and/or writing to a data storage medium. For example, disc drives are one popular form of data storage systems. Disc drives use rigid or flexible discs that include a storage medium for storage of digital information in a plurality of circular, concentric data tracks. The discs are mounted on a spindle motor which causes the discs to spin and the surfaces of the discs to pass under respective sliders. Such sliders use a fluid such as air to supply a hydrodynamic bearing force, which is typically counteracted by a load force. The sliders carry data interface heads, such as transducers, which write information to and/or read information from the disc surfaces.

A long-running objective in data storage systems has been to increase the density of data storage within a given area of data storage media. In pursuit of this objective, it is desired to reduce the height at which a slider flies over a data storage media surface. To accomplish this reduction in fly height while maintaining reliable performance, it is desirable to reduce the uncertainty and inconsistency in the fly height of the slider. It is also an important objective to control the pitch and roll of the slider with greater precision. Pitch outside of nominal range can drive inaccuracy in fly height, and can cause either the trailing edge or the leading edge of the slider to contact an opposing surface, sometimes catastrophically. Non-nominal roll can also degrade slider performance. This is particularly true when environmental conditions for the slider change over time. For example, the environment around a slider may vary in temperature, or the distribution of heat through different parts of the slider may vary over time.

A particular problem has been the interference of the hydrodynamic properties of the slider by the unavoidable expansion of slider components relative to other sections of the slider responsively to environmental factors. For example, a transducer typically has a higher coefficient of thermal expansion than a substrate or other materials of which the slider and its hydrodynamic surface are composed. This degrades the precision and performance of the slider in typical systems.

Embodiments of the present invention provide solutions to these and other problems, and offer other advantages over the prior art.

SUMMARY OF THE INVENTION

One embodiment of the present invention pertains to a slider that includes a substrate, a transducer tip disposed on the substrate, and a hydrodynamic surface including a responsive aeroelastic deposit. The substrate has a first coefficient of expansion responsive to a stimulus. The transducer tip has having a second coefficient of expansion responsive to the stimulus that is greater than the first coefficient of expansion. The aeroelastic deposit has a third coefficient of expansion responsive to the stimulus that is greater than the first coefficient of expansion.

Another embodiment of the present invention pertains to a slider that includes a substrate, a transducer disposed on the substrate, and a hydrodynamic surface. The hydrodynamic surface includes a substrate surface having a first coefficient of expansion responsive to a stimulus; a transducer tip of the transducer, the transducer tip having a second coefficient of expansion responsive to the stimulus that is greater than the first coefficient of expansion; and a means for altering a height of an aeroelastic feature of the hydrodynamic surface relative to both the substrate surface and the transducer tip, responsively to the stimulus.

Another embodiment of the present invention pertains to a data storage system that includes a media surface, a head assembly suspended above the media surface, and a slider suspended from the head assembly at a slider fly height above the media surface. The slider includes a substrate, a transducer tip disposed on the substrate and extending therefrom to a transducer tip height, and a hydrodynamic surface that includes a responsive aeroelastic deposit. The transducer tip has a second coefficient of expansion responsive to the stimulus that is greater than the first coefficient of expansion. The responsive aeroelastic deposit has a third coefficient of expansion responsive to the stimulus that is greater than the first coefficient of expansion.

Other features and benefits that characterize embodiments of the present invention will be apparent from the following detailed description and the associated drawings.

DETAILED DESCRIPTION OF ILLUSTRATIVE EMBODIMENTS

Figure 1:
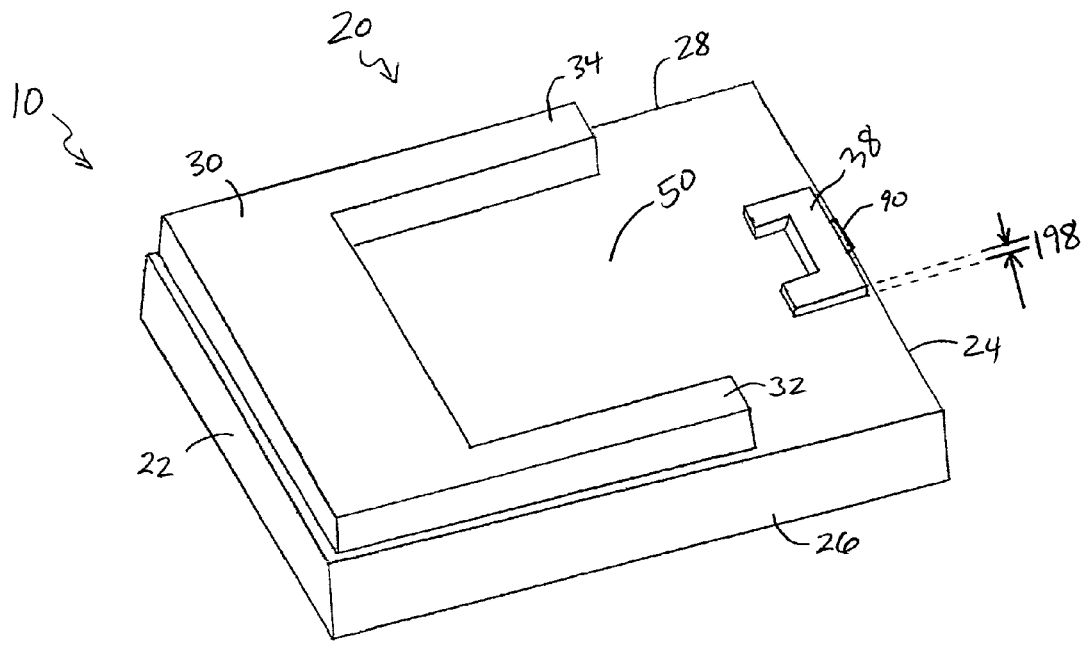
FIG. 1 depicts a perspective view of a slider including responsive aeroelastic deposit, according to one embodiment.

One embodiment of the present invention is directed to a slider having a responsive aeroelastic surface. That is, this embodiment of the slider has a hydrodynamic surface that includes a responsive aeroelastic deposit (RAD), a deposit that alters its form responsively to a stimulus. This may be manifested as altering its form in response to changes in ambient heat, or changes in the distribution of heat, or even changes in ambient humidity, for example. The responsive aeroelastic deposit may also alter its form in response to a stimulus exerted by the system in which the slider is incorporated, rather than a stimulus imposed by the ambient conditions, in other embodiments. For example, the responsive aeroelastic deposit may alter its form responsively to a change in an electric voltage, a magnetic field, or electromagnetic radiation applied to it. The responsive aeroelastic deposit may be disposed on and included on a variety of hydrodynamic surfaces of the slider, including a cavity surface, a bearing surface, a side surface, a leading surface, a trailing surface, or other surface of the slider, in different embodiments. Some embodiments of this invention thereby include a generalized system for altering the form and hydrodynamic properties of a slider or other substrate body responsively to any of a broad variety of stimuli.

In one embodiment, the slider includes an hydrodynamic surface that includes both a responsive aeroelastic deposit and a transducer tip, for example. In an application in which the ambient air flow is due to the relative motion between the slider and an opposing surface, one measurement of the fly height of the slider is defined as the displacement between the opposing surface and the transducer tip. The transducer tip is the tip, extending generally toward the opposing surface, of a significantly greater transducer body disposed on the slider, in this embodiment.

The optimum slider fly height under a given set of conditions is a compromise between keeping the fly height as low as possible, to enable greater electrical amplitude induced in the transducer by a data track on the opposing surface, and still keeping the fly height high enough to minimize contact events or a catastrophic crash between the slider and the opposing surface. In an alternative embodiment, the slider "flies" in dynamic contact with the opposing surface. While traditional sliders have a fixed geometry, some embodiments of the present invention respond to external conditions with responsive aeroelastic deposits that optimize fly height relative to those conditions. Since the risk of undesirable contact events or crashes is often a function of relevant external conditions, such as heat, mechanical disturbances and vibrations, and humidity, the optimum slider fly height also varies with external conditions. Some of these relevant external conditions, such as heat and humidity, can be sensed and translated into expansion or other movement directly by a responsive aeroelastic deposit; while others of these relevant external conditions, such as external shocks and vibrations, can be used to trigger a self-imposed stimulus, such as an electric voltage, a magnetic field, or electromagnetic radiation, by the system incorporating the slider.

Variation in the height of the transducer relative to the slider due to some of these stimulus conditions, such as thermal expansion, and the corresponding disturbance in fly height of the transducer over a media surface, have been a persistent problem in the prior art. A relationship known as the gain can be defined between the rate of variation in height of the transducer relative to the slider, measured from the tip of the transducer around its farthest extension from the slider and at its closest point toward a media surface, and the corresponding rate of variation in fly height of the slider relative to the media surface. If the slider is held at a constant height above the media surface while the transducer expands to a greater height above the slider, the gain is zero. In some prior art systems, the gain is typically not zero because the expansion of the transducer exerts some nontrivial effect on the hydrodynamic properties of the slider, adding a small degree of lift, so that the gain is somewhere between zero and one.

Various embodiments of the present invention include responsive aeroelastic deposits that alter the hydrodynamic properties of the slider such that the gain is substantially equal to one, or is greater than one, or is less than zero. In embodiments in which the gain is substantially equal to one, the increase in height of the transducer above the slider responsively to the stimulus is substantially equally matched by an increase in fly height of the slider above the media surface, so that the height of the transducer tip above the media surface has no substantial change. For example, if the increase in the fly height of the slider is within around ten or fifteen percent of the increase in the height of the transducer tip above the slider as both heights are affected by a change in the stimulus, this represents substantially the same rate of increase in height. In embodiments in which the gain is greater than one, the rate of increase in height of the transducer above the slider responsively to the stimulus is outmatched by a greater rate of increase in the fly height of the slider above the media surface, so that as the stimulus increases, the fly height of the transducer itself above the media surface increases. And in embodiments in which the gain is negative, i.e. less than zero, as the height of the transducer above the slider increases responsively to the stimulus, the fly height of the slider above the media surface decreases, significantly decreasing the fly height of the transducer above the media surface as the stimulus increases. The properties and advantages of these different embodiments are further apparent from the description herein.

The responsive aeroelastic deposit is thereby useful for altering the hydrodynamic properties of the slider as the stimulus alters. For the responsive aeroelastic deposit to alter relative to the surrounding substrate, the responsive aeroelastic deposit has a coefficient of expansion responsive to the stimulus that is greater than the coefficient of expansion of the substrate, and may be less than or greater than the coefficient of expansion of the transducer tip responsive to the stimulus. For example, the height of the responsive aeroelastic deposit above the substrate thereby can increase as the responsive aeroelastic deposit expands responsively to the stimulus. The responsive aeroelastic deposit is elastic, so it expands and contracts reversibly within normal operating parameters. In some embodiments, the expansion of the responsive aeroelastic deposit is directed linearly or vertically upward relative to the surrounding hydrodynamic surface; while in other embodiments, the expansion of the aeroelastic deposit is differentially distributed in the deposit so that it shears or bends rather than simply expanding linearly or vertically, for example; while in still other embodiments, the responsive aeroelastic deposit expands less than a surrounding hydrodynamic surface that may include the transducer tip, for example. Since the responsive aeroelastic deposit alters the hydrodynamic properties of the slider as it expands or contracts in response to the stimulus, a slider including such a deposit is a responsively aeroelastic slider.

The responsive aeroelastic deposit can take a variety of different forms and can be disposed on a variety of locations on a hydrodynamic surface of the slider, in different embodiments. For example, the responsive aeroelastic deposit may take the form of a bearing surface, a convergent channel, a channel wall, a cavity floor, a cavity dam, a cavity wall, or some other above-ambient or below-ambient pressure formation or component thereof, or some other form. As additional examples, the responsive aeroelastic deposit may be included on a bearing surface, a cavity surface, a leading surface, a trailing surface, or a side surface of the slider, in other illustrative embodiments. The differentially responsive aeroelastic deposit (RAD) is thereby able to achieve a wide variety of different performance goals in various embodiments, including increasing or decreasing the lift, pitch, and/or roll of the slider, responsively to the change in the stimulus. One or more of these responsive aeroelastic deposits, in any of a great variety of configurations, may be disposed on a hydrodynamic surface of a slider to tailor the slider's hydrodynamic properties responsively to one or more specific stimuli.

In some embodiments, the responsive aeroelastic deposit may be applied directly onto a hydrodynamic surface of an individual slider during manufacture. In other embodiments, the aeroelastic deposit may be applied to the substrate at an earlier phase of manufacture, when it is still in wafer form, before being sliced into separate bars, or still in bar form before being diced into separate sliders, according to one possible process for manufacturing sliders of some embodiments. This corresponds to some embodiments wherein the transducer material is added to the substrate when it is in wafer form, to a side of the wafer that corresponds with what becomes the trailing surfaces of the sliders. Responsive aeroelastic deposit material may also be deposited at the wafer level, on either side of the wafer, to become included in either a trailing surface or a leading surface of the sliders formed from the wafer. The responsive aeroelastic material may also be deposited in a variety of arrangements with the transducer material on the trailing surface side of the wafer, which may form hydrodynamic features including both transducer materials and responsive aeroelastic deposit materials associated with the trailing edge of a slider made therefrom. This may include, for example, a trailing bearing surface incorporating both a transducer tip and a responsive aeroelastic deposit. As another example, this could include a convergent channel associated with the trailing edge of a slider, wherein the responsive aeroelastic deposit has a coefficient of expansion responsive to the stimulus that is less than that of the transducer tip, and the cavity surface of the convergent channel includes the responsive aeroelastic deposit, while the channel wall comprises the transducer tip. Other arrangements can occur in other embodiments.

Responsive aeroelastic deposits may also be deposited onto sliders either in bar form or in the form of individual sliders. Depending on the particulars of a manufacturing method, this may involve a potentially greater difficulty or cost in manufacturing, but with added capability and flexibility for incorporating responsive aeroelastic deposits in the sliders. These and other methods of manufacturing a slider having responsive aeroelastic deposits provide different relative advantages in economy of manufacturing, variety or flexibility of configurations of the hydrodynamic surface, and other performance goals. A responsive aeroelastic deposit may be added to any of a variety of surfaces on the slider, including bearing surfaces, cavity surfaces, the leading surface, the trailing surface, and the side surfaces.

Different performance goals are served by different arrangements and dispositions of the responsive aeroelastic deposits, according to the performance demands of various embodiments. For example, ramped or unevenly shaped responsive aeroelastic deposits on the side surfaces of a slider may cause a roll of the slider to increase responsively with the expansion of the responsive aeroelastic slider. As another example, responsive aeroelastic deposits positioned on the leading surface and having a ramped shape may cause a pitch of the slider to increase responsively to the stimulus. As another example, responsive aeroelastic deposits positioned on the slider as bearing surfaces may cause a lift of the slider to increase responsively to the stimulus. Other arrangements of slider geometry can be integrated with responsive aeroelastic deposits to achieve performance goals including those listed above; these can occur in a variety of other embodiments that those competent in the art will readily appreciate from the description herein.

FIG. 1 provides one example of such a slider with a hydrodynamic surface including an aeroelastic deposit. FIG. 1 is a perspective view of a slider 10 including hydrodynamic surface 20, according to one illustrative embodiment. Slider 10 includes leading hydrodynamic surface 22, trailing hydrodynamic surface 24, and side hydrodynamic surfaces 26 and 28. Hydrodynamic surface 20 includes leading bearing surface 30, from which side arms 32 and 34 extend toward the trailing surface 24. Hydrodynamic surface 20 also includes a responsive aeroelastic deposit (RAD) bearing surface 38 near trailing surface 24, adjacent to which transducer tip 90 is disposed. RAD bearing surface 38 is composed of an aeroelastic deposit that has a particularly high coefficient of expansion responsive to the stimulus, relative to the substrate surfaces composing the surrounding aerodynamic surface 20. In one embodiment, transducer tip 90 projects above portions of the nearby hydrodynamic surface 20. Transducer tip 90 can include a variety of different types of transducers, such as a magnetic transducer, a laser, a photoreceptor, a magnetoresistive element, or an optical transducer, for example. Cavity floor 50 is disposed on the hydrodynamic surface, partially encompassed by leading bearing surface 30, side arms 32 and 34, and trailing RAD bearing surface 38. Leading bearing surface 30, side arms 32 and 34, and cavity floor 50 are formed of a substrate of which the body of slider 10 is largely composed.

RAD bearing surface 38 is composed of a different type of material than the substrate and the transducer tip 90. RAD bearing surface 38 has a coefficient of expansion responsive to a stimulus that is different than the substrate's coefficient of expansion responsive to that stimulus. For example, the relevant stimulus in this embodiment may be heat, in which case the RAD bearing surface 38 can have a greater coefficient of thermal expansion than the surrounding substrate, so that as the hydrodynamic surface is subjected to more heat, the height of the RAD bearing surface 38 increases or decreases relative to the surrounding hydrodynamic surface.

Figure 2:
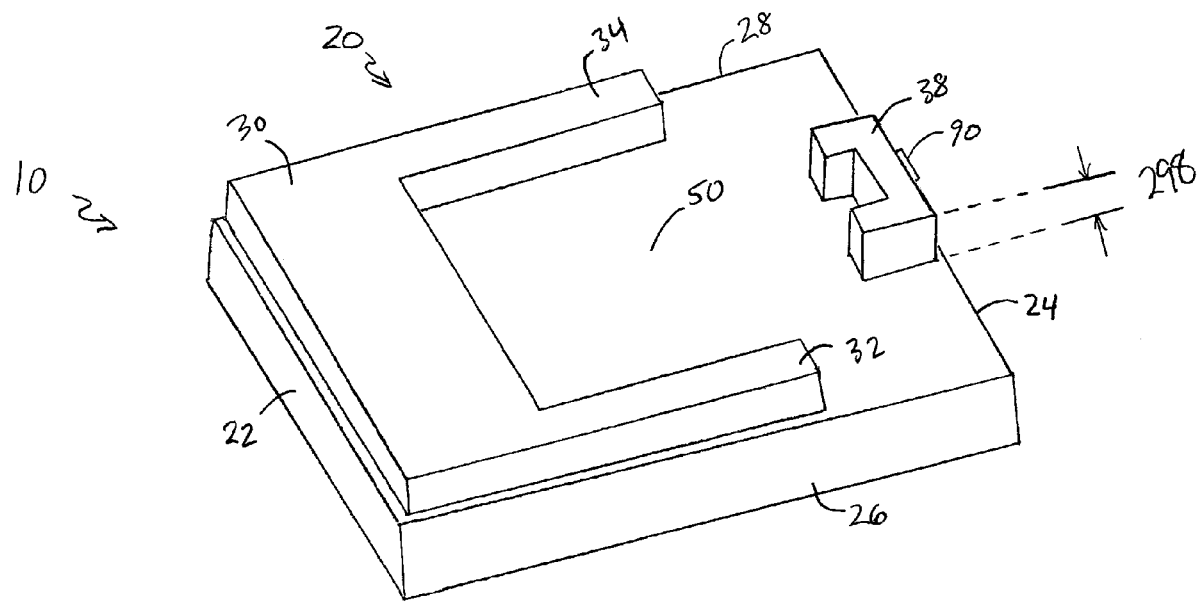
FIG. 2 depicts a perspective view of a slider including responsive aeroelastic deposit, according to one embodiment.

FIG. 2 depicts the same slider as in FIG. 1, but after having been subjected to a greater degree of the relevant stimulus, such as heat in the foregoing example. The RAD bearing surface 38 is shown to have expanded at a greater rate than the surrounding material, to stand at a greater height relative to the surrounding hydrodynamic surface. Specifically, the height of RAD bearing surface 38 relative to the surrounding portions of aerodynamic surface 20 is depicted as height 198 when RAD bearing surface 38 is under a low degree of the relevant stimulus in FIG. 1; while the height of RAD bearing surface 38 relative to the surrounding portions of aerodynamic surface 20 is depicted as height 298 when RAD bearing surface 38 is subjected to an elevated degree of the relevant stimulus in FIG. 2.

The transducer tip 90 also has a higher coefficient of expansion relative to the stimulus, so it has also increased its height above the surrounding hydrodynamic surface. Since the RAD bearing surface 38 and the transducer tip 90 both form a part of the hydrodynamic surface 20, it is understood that they do not necessarily increase their height relative to the entire surrounding hydrodynamic surface, but above at least a portion of the hydrodynamic surface. The degree of expansion of RAD bearing surface 38 has been exaggerated in FIG. 2 for clarity.

In one embodiment, transducer tip 90 has a higher coefficient of thermal expansion than the body of slider 10, and which tends to be heated more than the body of the slider 10 by electric current that passes through it during ordinary use. This results in transducer tip 90 expanding more than the body of the slider 10, and raising its height above at least a portion of the surrounding hydrodynamic surface 20, a phenomenon referred to as thermal pole tip protrusion (TPTP). This increase of the height of transducer tip 90 relative to other portions of the hydrodynamic surface 20 alters the hydrodynamic properties of hydrodynamic surface 20, potentially including lift, pitch and/or roll characteristics, and can reduce precision in fly height. The responsive aeroelastic deposit (RAD) aspect of trailing RAD bearing surface 38 corrects for the undesirable effects of TPTP. The undesirable effects of thermal pole tip protrusion, along with the corrective effects of the RAD aspect of trailing RAD bearing surface 38, are best understood in the context of a system in which slider 10 can be incorporated.

Figure 3:
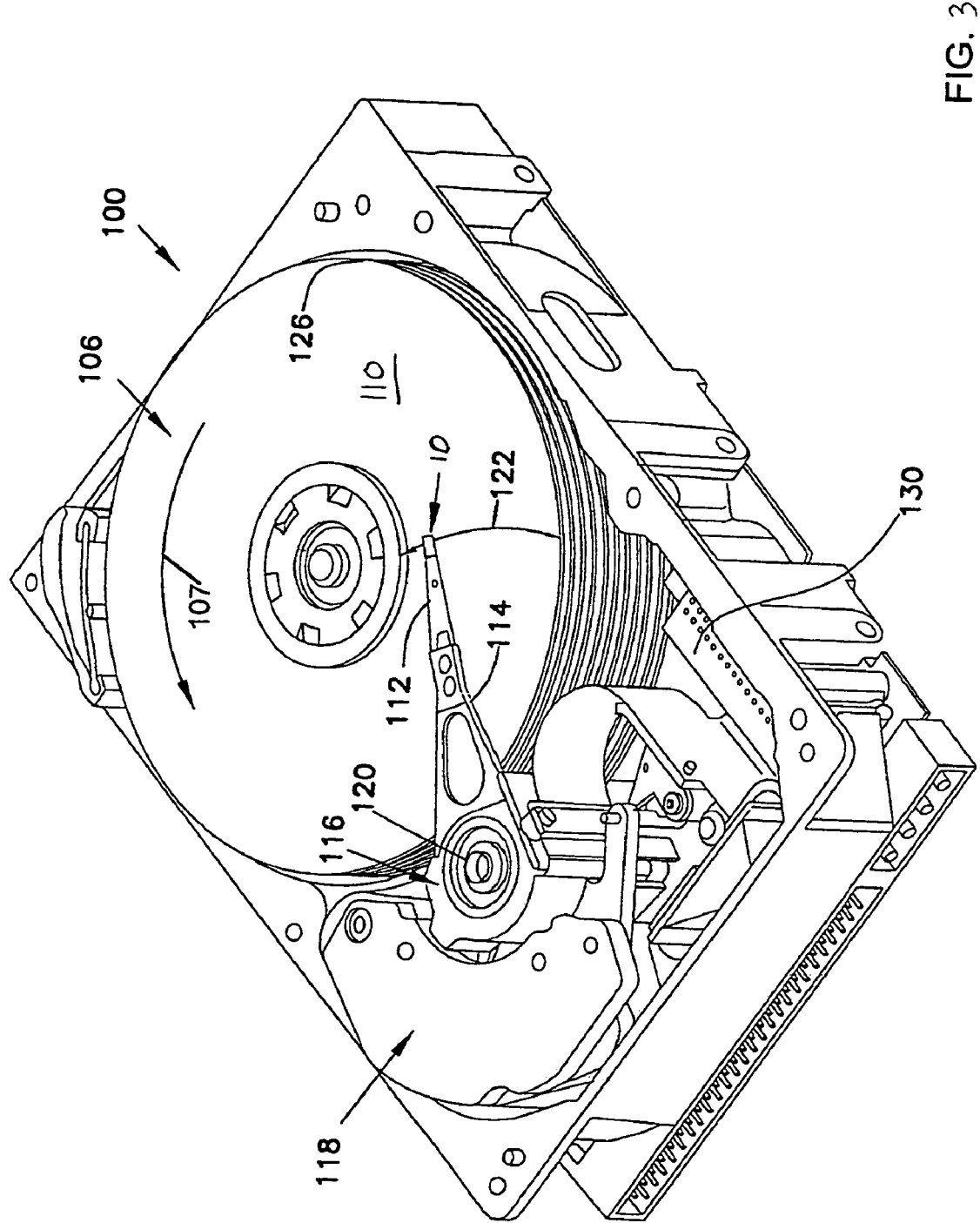
FIG. 3 depicts a representative system in which a slider of the present invention is incorporated, according to one embodiment.

FIG. 3 depicts one embodiment of a system 100 in which slider 10, including a deposit that expands responsively to a stimulus, is incorporated. System 100 is a disc drive, one example from the variety of data storage systems and other systems to which the present invention is applicable. System 100 includes a disc pack 126 having storage surfaces 106 that are typically layers of magnetic material. The disc pack 126 includes a stack of multiple discs. A head assembly 112 includes the slider 10 with magnetic transducer tip 90 poised above opposing surface 110 of the top disc of disc pack 126. Each of the other disc surfaces 106 in disc pack 126 is likewise interfaced by a similarly disposed slider (not shown). Disc pack 126 is spun or rotated as shown by arrow 107 to allow head assembly 112 to access different rotational locations for data on the media surfaces 106 on the disc pack 126. Head assembly 112 supplies a load force to slider 10 which is substantially normal to opposing disc surface 110. The load force counteracts a hydrodynamic lifting force developed between slider 10 and disc surface 110 during the rotation of disc pack 126, due to the flow of an ambient fluid, either a liquid fluid or a gaseous fluid such as atmospheric air or argon for example, caused by the motion of disc surface 110.

Head assembly 112 is actuated to move radially relative to the disc pack 126, as shown by arrow 122, to access different radial locations for data on the storage surfaces 106 of disc pack 126. Typically, the actuation of head assembly 112 is provided by a voice coil motor 118. Voice coil motor 118 includes a rotor 116 that pivots on axle 120 and an arm 114 that actuates the head assembly 112. A circuit at location 130 controls the position of slider 10 and electrically interfaces the transducer tip 90 of slider 10 with a computing environment. Other types of actuators, such as linear actuators, can also be used in alternative embodiments.

In system 100, a displacement is defined between the opposing surface 110, and the tip of the transducer tip 90 on slider 10. This displacement defines a fly height of slider 10. Since the opposing surface 110 in system 100 is a media surface, this spacing can also be referred to as head-media separation (HMS). In this embodiment, transducer tip 90 is the closest point of slider 10 to the opposing surface 110. However, in alternative embodiments, the transducer can be positioned at various other locations on or in the substrate, such as at a location between leading surface 22 and trailing surface 24.

Thermal pole tip protrusion, as discussed above, is a source of imprecision of the head-media separation. The expansion of RAD bearing surface 38 responsive to the stimulus may be used to compensate for thermal pole tip protrusion, to cancel out the effects of thermal pole tip protrusion on the hydrodynamic properties of hydrodynamic surface 20, for instance.

So, while traditional systems typically suffer from poorer performance due to the unavoidable effects of differential responsiveness of various slider components to environmental stimuli such as heat, certain embodiments of the present invention are designed to use such inevitable effects from environmental stimuli to enhance performance. As one example, while in some embodiments the transducer tip 90 has a higher coefficient of thermal expansion than the substrate forming much of the surrounding aerodynamic surface 20, and it is inevitable in such embodiments for the transducer tip 90 to expand to a greater height relative to the surrounding aerodynamic surface 20, such an embodiment is set apart from traditional sliders in part by the inclusion of a separate component that also has a coefficient of thermal expansion higher than that of the surrounding aerodynamic surface 20, with that separate component being the RAD bearing surface 38 in the particular illustrative embodiment of FIGS. 1 and 2, for example. While the expansion of the transducer tip 90 lowers the fly height and thereby might by itself raise the risk of undesirable contact, the corresponding expansion of RAD bearing surface 38 in the particular illustrative embodiment of FIGS. 1 and 2 raises the aerodynamic lift of slider 10 in tandem with the expansion of transducer tip 90, thus always maintaining the fly height at a desirable level which optimizes the combination of staying high enough to minimize the risk of contact events, while staying low enough to maximize the electrical amplitude induced in transducer tip 90 by the adjacent data track, in this illustrative embodiment. Keeping the fly height of the transducer low can serve other performance goals in alternative embodiments.

In an alternative embodiment, the RAD bearing surface 38 is selected not just to compensate, but to overcompensate for the effects of thermal pole tip protrusion. This may be the case, for instance, in an application in which additional ambient heat not only causes thermal pole tip protrusion, but also increases other forms of imprecision in flight characteristics, such as increased unevenness of the opposing surface 110, reduced viscosity of a lubricant disposed on the opposing surface (not shown), or decreased stiffness in the head assembly 112 and/or arm 114 maintaining slider 10 in its flight position, for example. In such cases, it may be desirable for the slider 10 and transducer tip 90 to have an increased fly height above the opposing surface 110 as the ambient temperature rises. RAD bearing surface 38 is capable of increasing fly height as a function of temperature. The substrate and transducer tip 90 also each have a finite coefficient of thermal expansion, though the coefficient of thermal expansion of the substrate is less than those of the transducer tip 90 and the RAD bearing surface 38, in this embodiment.

While heat is one form of stimulus to which RAD bearing surface 38 may be responsive, other embodiments include a RAD bearing surface 38 that expands responsively to an electric field, a magnetic field, electromagnetic radiation, humidity, or other forms of stimulus. For example, in one embodiment, RAD bearing surface 38 includes a piezoelectric material, and the slider 10 includes electric leads (not shown) to manipulate an electric voltage on deposit 38. As the electric voltage is increased, deposit 38 expands and its height above the surrounding hydrodynamic surface 20 increases. Unlike using heat as the stimulus, this stimulus for altering hydrodynamic surface 20 is independent of unavoidable environmental effects on RAD bearing surface 38, providing unique advantages. For example, a computing environment (not shown) in which system 100 is incorporated may have a means for sensing the level of ambient mechanical vibrations or disturbances, of the type that might correspond to the system being used in a portable application. For example, this could be the case when a computing environment incorporating the present invention is a notebook or handheld computer being used on a vehicle or in hand. When the system 100 thereby senses vibrations and mechanical disturbances, it changes an electric voltage or electric current imposed on RAD bearing surface 38, thereby causing RAD bearing surface 38 to expand, which then raises the fly height of slider 10. Specifically, the system may include an accelerometer and a software application, in one embodiment. The software application receives as input the acceleration of the system over time as measured by the accelerometer, and feeds that input through an algorithm that assigns different weights to different values of acceleration as a function of time elapsed, and thereby produces a characterization of the ongoing operating conditions of the system. This includes assigning a target fly height for the slider, to be achieved by actuation of the stimulus to which the RAD bearing surface 38 is responsive, in this illustrative embodiment.

This adds an extra margin of safety to ensure preventing slider 10 from contacting opposing surface 110. The coefficient of expansion of the substrate responsive to this electric voltage is close to zero in this embodiment, and is likewise much less than that of the RAD bearing surface 38 in other embodiments. While the transducer tip 90 may have significant expansion due to electric current passing through it, due mainly to thermal expansion due to the electric current passing through it, the voltage applied to the RAD bearing surface 38 is locally applied, and does not significantly affect transducer tip 90.

In another embodiment, RAD bearing surface 38 comprises a magnetostrictive material, so that it expands responsively to a magnetic field as the stimulus. The slider 10 includes a mechanism such as an electromagnet (not shown) disposed near RAD bearing surface 38 for imposing a magnetic field of a selected strength. As above, this embodiment of system 100 includes a means for determining an optimum margin of safety for fly height of slider 10 above opposing surface 110 as a function of environmental factors such as ambient mechanical disturbances, and imposes a magnetic field accordingly through the electromagnet. The coefficients of expansion of the substrate and the transducer tip 90 responsive to the magnetic field stimulus are much less than that of the RAD bearing surface 38 and are not significant in this embodiment.

In another embodiment, RAD bearing surface 38 comprises a photostrictive material, so that it expands responsively to electromagnetic radiation as the stimulus. This electromagnetic radiation may be within the infrared, visible, ultraviolet, or other segment of the electromagnetic spectrum. In one exemplary embodiment using electromagnetic radiation of the ultraviolet part of the spectrum, the slider 10 includes an ultraviolet source (not shown) aimed at RAD bearing surface 38. In this embodiment, RAD bearing surface 38 includes the photostrictive material PLZT, an alloy that includes lead, lanthanum, zirconium, and titanium, which translates ultraviolet light into mechanical strain, and thereby expands when exposed to ultraviolet light. As above, this embodiment of system 100 includes a means for determining an optimum margin of safety for fly height of slider 10 above opposing surface 110 as a function of ambient conditions, and activates the ultraviolet source at a selected intensity accordingly, to shine on the photostrictive RAD bearing surface 38. In other embodiments, the ultraviolet source may be located off slider 10 and disposed instead elsewhere in system 100 where it nevertheless is able to aim at slider 10. Such a capability for remote placement of the light source represents a particular advantage of light-stimulus embodiments. The coefficients of expansion of the substrate and the transducer tip 90 responsive to the light stimulus are negligible, or otherwise insignificant and much less than that of the RAD bearing surface 38.

In yet another embodiment, RAD bearing surface 38 includes a material that expands responsively to humidity as a stimulus. In one embodiment, for example, RAD bearing surface 38 includes plasma enhanced chemical vapor deposition (PECVD) silicon dioxide, which translates ambient humidity into mechanical strain. This is another example, like the thermal stimulus embodiments, in which the condition intended to be corrected for is used as the stimulus itself. High ambient humidity can raise the risk of imprecise or undesirable slider behavior, and can cause viscosity breakdown or otherwise interfere with the properties of a lubricant protecting opposing surface 110. As the humidity rises, the RAD bearing surface 38 expands, increasing its height above the surrounding hydrodynamic surface 20. The coefficients of expansion of the substrate and the transducer tip 90 responsive to the humidity stimulus are insignificant or otherwise much less than that of the RAD bearing surface 38.

While RAD bearing surface 38 is depicted and described with a certain geometry and location on aerodynamic surface 20 in FIGS. 1 and 2 and the accompanying description above, a wide variety of other geometries and locations, including on bearing surfaces, cavity surfaces, side surfaces, the leading surface and the trailing surface, for reactive aeroelastic deposits occur in alternative embodiments. The different varieties of reactive aeroelastic deposits discussed above, each responsive to a different stimulus, also may be combined with these alternative geometries and locations.

Figure 4:
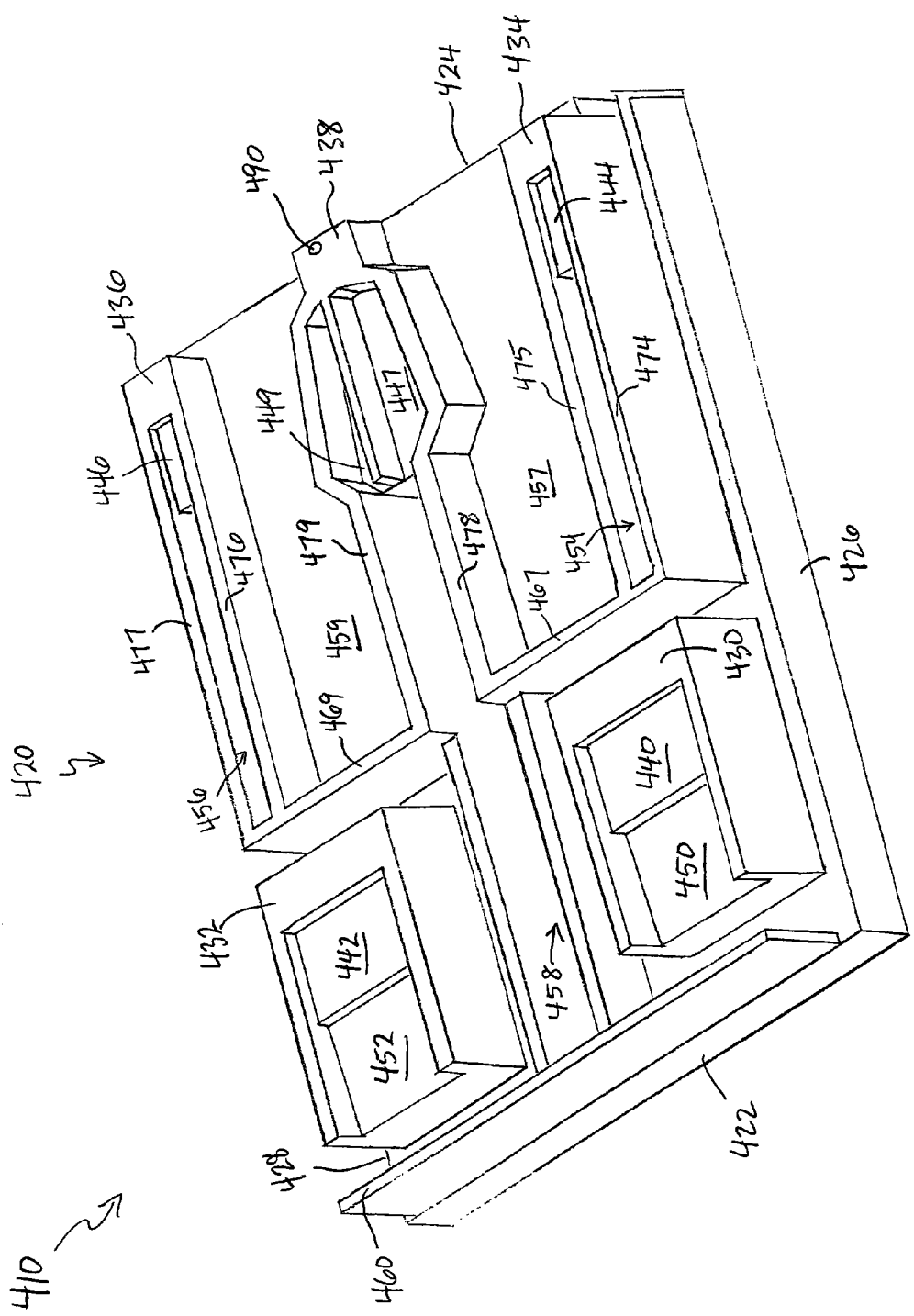
FIG. 4 depicts a perspective view of a slider including responsive aeroelastic deposit, according to one embodiment.
Figure 5:
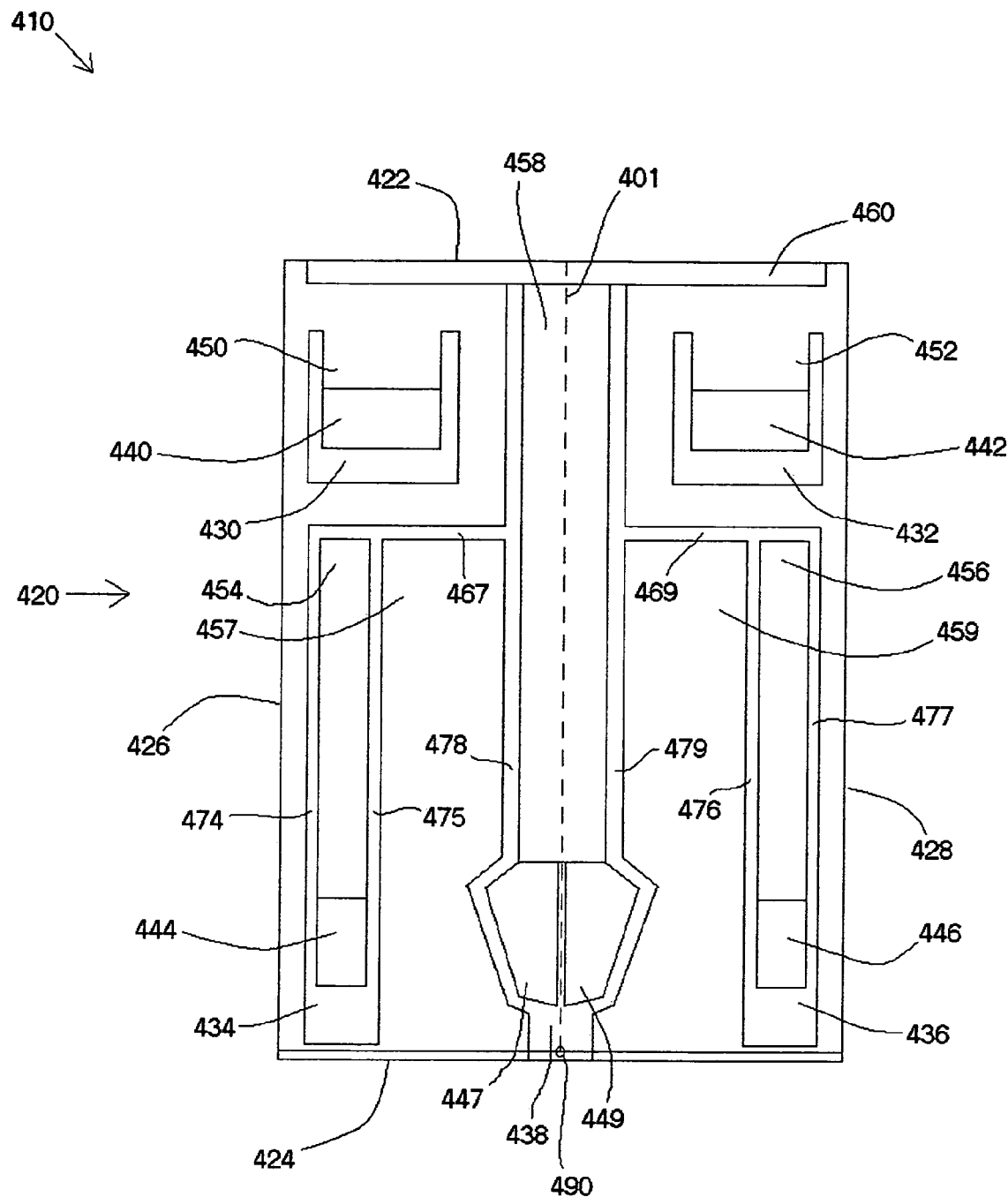
FIG. 5 depicts a top plan view of a hydrodynamic surface of a slider, according to one embodiment.

FIG. 4 is a perspective view of a slider 410 including hydrodynamic surface 420, according to another embodiment of the present invention. FIG. 5 depicts a top plan view of the hydrodynamic surface 420 of slider 410. Slider 410 serves as another representative example of various possible types of embodiments of the present invention. In FIGS. 4 and 5, hydrodynamic surface 420 has a variety of features at various heights, any of which can take the form of a responsive aeroelastic deposit in different embodiments. When slider 410 is exposed to an ambient fluid flow, these features provide differential pressurization on the hydrodynamic surface to provide pitch stiffness, roll stiffness, fly height precision, and other advantages. When a responsive aeroelastic deposit feature is exposed to the stimulus, it responsively expands to an increased height, which alters the pitch stiffness, roll stiffness, and/or fly height, in different embodiments. In other embodiments, the expansion is differential within the RAD to provide shear or bending, rather than simple linear expansion to an increased height. A variety of embodiments of slider 410 are described below with reference to FIGS. 4 and 5, all of which share in the geometry depicted, but which differ in what features are composed of responsive aeroelastic deposits and what features remain of traditional composition having little if any coefficient of expansion relative to the stimulus. Since any permutation is possible of aeroelastic deposits responsive to different stimuli and in different arrangements and components of a hydrodynamic slider surface, the geometric descriptions below refer simply to a generalized relevant stimulus for a given feature, indicating whatever stimulus to which the aeroelastic slider is responsive in a specific embodiment. The relevant stimulus to which a RAD surface may be responsive may be heat, electric voltage, magnetic field, electromagnetic radiation, humidity, or some other stimulus, as described above. These examples help to demonstrate the vast variety of different useful embodiments of sliders that include responsive aeroelastic deposits among their hydrodynamic surfaces.

The various surfaces at different depths of hydrodynamic surface 420 may be formed by any of several well-known and newer manufacturing techniques, including ion milling, reactive ion etching, chemical etching, or lapping, for example. The depths have been depicted in FIG. 4 in exaggerated and disproportionate form to aid in perceiving detail. Different embodiments therefore include surfaces that are adapted to provide above-ambient pressurization, or local pressurization of an ambient fluid that is above the ambient pressure of that fluid. Other embodiments include sub-ambient pressurization features, adapted to provide pressurization that is locally below that of the ambient pressure of the fluid. These surfaces are adapted to provide such pressurization characteristics when the slider 410 is subjected to an ambient fluid flow, such as when engaged in a nominal flying motion within a system, such as data storage system 100 of FIG. 3, within which slider 410 is incorporated. Still other embodiments combine RAD surfaces in both above-ambient and sub-ambient pressurization features.

More particularly, hydrodynamic surface 420 is bounded by a leading surface 422, a trailing surface 424, a left side surface 426 and a right side surface 428. Hydrodynamic surface 420 includes side leading bearing surfaces 430 and 432 near leading surface 422, and side trailing recessed surfaces 434 and 436 and center trailing bearing surface 438 near trailing surface 424. Bearing surfaces 430, 432, and 438 provide above-ambient pressurization under normal, steady state conditions of slider flight. Side trailing recessed surfaces 434 and 436 are replaced by bearing surfaces in some embodiments of slider 410, where they occupy the bearing height rather than only the slightly lesser recessed height. On the other hand, in the illustrative embodiment depicted in FIG. 4, recessed surfaces 434 and 436 are slightly or moderately recessed in height relative to bearing surfaces 430, 432 and 438 in other embodiments. Additional arrangements can also occur in addition to these illustrative examples, with various combinations of surfaces at the bearing height and recessed below the bearing height. In the illustrative embodiment including side trailing recessed surfaces 434 and 436 at a recessed height, they are recessed at around 300 angstroms below the bearing height, for example, and may provide dynamic, intermittent pressurization. This may occur when slider 410 experiences a significant roll about its longitudinal axis during flight, beyond the nominal range of roll for which the counteracting pressurization from one of the side leading bearing surfaces 430 and 432 is sufficient to correct. In this event, the side trailing surfaces 434 and 436 may come close enough to an opposing surface to provide substantial local pressurization, reinforcing the ability of slider 410 to resist excessive roll and to return to within nominal roll parameters. In additional embodiments incorporating recessed surfaces that may provide intermittent or dynamic pressurization, the recessed surfaces extend to a height of between zero and about 550 angstroms below the bearing height, for example.

When slider 410 is in flight as incorporated in a nominally operating system, such as data storage system 100, a fluid such as air flows across hydrodynamic surface 420 from the general direction of leading surface 422 toward the general direction of trailing surface 424. The interaction of this fluid flow with the various features of the hydrodynamic surface 420 provides advantageous properties of motion for slider 410, including the above-ambient pressurization provided by bearing surfaces 430, 432, and 438 and intermittent pressurization provided by recessed surfaces 434 and 436, any one of which could be formed of a responsive aeroelastic deposit, in different embodiments.

Hydrodynamic surface 420 includes transducer tip 490. As incorporated in a system 100, a fly height of the slider 410 is defined as the displacement between the opposing surface 110 and the tip of the transducer tip 490. The optimum slider fly height under a given set of conditions is an optimum compromise between keeping the fly height as low as possible, to enable greater electrical amplitude induced in transducer 90 by the adjacent data track on the opposing surface 110, and still keeping the fly height high enough reliably to prevent contact events or a catastrophic crash between the slider 410 and the opposing surface 110, in this illustrative embodiment.

The displacement of a particular feature of hydrodynamic surface 420 from the opposing surface 110 may be considered the local fly height of that particular feature. The above-ambient pressurization provided by one of the bearing surfaces 430, 432, and 438 increases as the local fly height between that individual bearing surface and the opposing surface decreases. This effect, combined with the placement of the bearing surfaces 430, 432, and 438 on the hydrodynamic surface, provides a negative feedback mechanism on the orientation of the slider, reinforcing its stability in at least one of the flight characteristics discussed above. For example, if two bearing surfaces are disposed near the side surfaces 426, 428 of the hydrodynamic surface 420, opposite each other across the longitudinal centerline 401, such as the bearing surfaces 430 and 432 or recessed surfaces 434 and 436, and the roll of the slider is disturbed away from a horizontal, zero roll orientation, then the bearing surface on the side that is brought closer to the opposing surface 110 due to the roll will exert an above-ambient pressure on that side of the hydrodynamic surface 420 that is greater than the pressure on the opposing side of the hydrodynamic surface 420. This raises roll responsively to the stimulus and exerts a corrective roll on the slider 410 opposite to the original roll, tending to return the slider 410 to a minimized roll orientation.

In one embodiment, the leading bearing surfaces 430, 432 are composed of responsive aeroelastic deposits, responsive to the particular stimulus of heat. As bearing surfaces 430, 432 heat up, they expand, increasing their height above surrounding portions of hydrodynamic surface 420, such as cavity floors 450 and 452, respectively. As their height rises, the pressurization provided by bearing surfaces 430, 432 also rises. This in turn may cause an increase in the fly height or the pitch of slider 410. The degree to which either of these parameters increases depends on the properties of other features of hydrodynamic surface 420 in a particular embodiment. For example, leading bearing surfaces 430, 432 composed at least in part of responsive aeroelastic deposits (RAD) are combined with trailing bearing surface 438 and recessed surfaces 434 and 436 also composed at least in part of RAD, in one particular embodiment. In this case, the expansion of all the bearing surfaces together, in response to an increase in the relevant stimulus, causes an increase in the fly height of the slider 410, with relatively little increase in the pitch of slider 410. In another particular embodiment, leading bearing surfaces 430, 432 are the only RAD features of hydrodynamic surface 420. In this case, while an increase in the stimulus causes an expansion and increase of height of the leading bearing surfaces 430, 432, the trailing recessed surfaces 434, 436 and trailing bearing surface 438 are composed of the same substrate material as the body of the slider 410, having a small to negligible coefficient of expansion responsive to the stimulus, thereby having little to no expansion. The increase in height by leading bearing surfaces 430, 432 alone among the features of hydrodynamic surface 420, raises the pressurization of the leading side of hydrodynamic surface 420 relative to the trailing side, thereby causing a substantial increase in the pitch of slider 410, along with some increase in the fly height of slider 410.

Hydrodynamic surface 420 also includes cavity surfaces at a lower height than the bearing surfaces. These cavity surfaces include both cavity floors 450, 452, 454, 456, 457, 458, 459, forming a floor of the hydrodynamic surface 420, and step surfaces 440, 442, 444, 446, 447, 449 at an intermediate height between the cavity floors and the bearing surfaces. Such step surfaces in general are useful for "ramping up" a flow of air before it gets to a bearing surface, or to assist in creating a desirable pattern of differential pressurization associated with the bearing surface. Channel walls 474, 475, 476, 477, 478, 479 are also usefully disposed on either side of an air flow path over a cavity floor and/or a step surface leading up to a bearing surface, to prevent the air from flowing laterally around the obstacles of the step surface and/or bearing surface, and instead restrict the flow of air to the two dimensions of longitudinal and vertical flow.

For example, cavity surface 454, step surface 444, and recessed surface 434 are associated together in a convergent channel. The air flow is guided between channel walls 474, 475 and is thereby prevented from dissipating laterally, instead being directed longitudinally toward the trailing surface 424 and being compressed vertically as the available flow paths converge together over step surface 444 and recessed surface 434. The fluid flow is forced to rise up and over step surface 444 and to converge into a pressurization flow along recessed surface 434. This causes localized pressure gradients at discrete regions on recessed surface 434. These localized pressure gradients increase the roll stiffness of slider 410 and yield high peak pressures that dampen roll mode vibrations at the natural resonant frequencies of slider 410. Any of the components of the convergent channel, including cavity surface 454, step surface 444, recessed surface 434, and/or channel walls 474, 475, can be composed of a responsive aeroelastic deposit, to allow for variability and optimization in the roll stiffness, roll vibration dampening, and other desirable hydrodynamic properties of the convergent channel associated with recessed surface 434.

Likewise, another convergent channel is formed on the longitudinally opposite side of the hydrodynamic surface 420, including cavity surface 456, step surface 446, and recessed surface 436, along with channel walls 476 and 477, any of which components may also be composed of responsive aeroelastic deposits (RADs). The RADs are spaced symmetrically about the longitudinal centerline 401 of hydrodynamic surface 420 in some embodiments; though in other embodiments, the RADs are disposed asymmetrically about the longitudinal centerline 401, such as to enable corrective responsiveness to a roll of slider 410.

Another convergent channel is formed along the longitudinal centerline 401 of hydrodynamic surface 420, including cavity surface 458, step surfaces 447 and 449, bearing surface 438, and channel walls 478 and 479. This structure converges the fluid flow along cavity surface 458, over step surfaces 447 and 449, into a positive pressurization on trailing bearing surface 438, similarly to the function described above for the convergent channels incorporating recessed surfaces 434 and 436. Again, any features of this convergent channel may be RAD in different embodiments. In a convergent channel, a RAD bearing surface combined with a substrate cavity floor acts to increase fly height as the relevant stimulus increases, while a substrate bearing surface combined with a RAD cavity floor acts to decrease fly height as the relevant stimulus increases.

Cavity dams 467 and 469 provide for sub-ambient pressurization on cavity floors 457 and 459, respectively. The air is restricted as it flows over cavity dams 467 and 469, then is rarefied as it passes into the greater available volumes present above cavity floors 457 and 459, respectively. This rarefying effect leaves the air above cavity floors 457 and 454 at a reduced, sub-ambient pressure. In one illustrative embodiment, cavity dams 467 and 469 comprise responsive aeroelastic deposits. Cavity dams 467 and 469 thereby expand responsively to the stimulus, increasing their height above the surrounding cavity floors 457 and 459, respectively, as the stimulus increases. This increases the effect of creating the sub-ambient pressurization, and increases the difference by which the pressure is reduced in the areas of cavity floors 457 and 459. This in turn acts to decrease the fly height of slider 410 as the relevant stimulus is increased.

Providing variably sub-ambient pressure in a sub-ambient pressurization zone of a slider has several potential advantages. For example, in a slider that uses responsive aeroelastic bearing surfaces that increase their height responsively to the stimulus, it may be advantageous for the cavity dams also to increase in height to "keep pace" with the bearing surfaces, and maintain desired hydrodynamic properties relative to the above-ambient pressurization features. As another example, the increase in sub-ambient pressurization effect may be desirable to reduce fly height below its default, unstimulated level. In such an embodiment, the cavity dams 467, 469 may be the only RAD surfaces on hydrodynamic surface 420, such that the fly height of slider 410 is reduced as the relevant stimulus increases. This may be the case, for example, in a data storage system 100 incorporated in a portable application such as a handheld computer. A system of this embodiment is designed for a default mode in which the computer is being held in hand and accordingly subject to near-constant vibrations. The default optimum fly height would be high enough to take those vibrations into account. However, the system of this embodiment is also designed to recognize when mechanical vibrations are unusually absent, such as when the handheld computer is being operated while set on a stationary surface. In such an event, the system of this embodiment engages a stimulus, such as an electric voltage, a magnetic field, or electromagnetic radiation, exerted on a cavity dam to increase the sub-ambient pressurization effect, and reduce fly height. This mode of operation takes advantage of the temporary reduction in mechanical disturbance to provide an active stimulated response to lower the fly height and provide for greater signal amplitude between transducer 490 and a data track on opposing surface 110.

Step surfaces are disposed on the hydrodynamic surface 420 at an intermediate height above the cavity floors, and below the bearing surfaces. They include step surfaces 440, 442, 444, 446, 447 and 449. A step surface functions advantageously, such as to serve as a transition ramp between a cavity surface and a bearing surface, to assist in the compression of the air flow into above-ambient pressurization. As a particular example, step surface 440 provides a transition ramp between cavity floor 450 and bearing surface 430. Other examples of advantageous function are apparent elsewhere in this description and in the figures.

In some embodiments, any or all of step surfaces 440, 442, 444, 446, 447 and 449 are composed of responsive aeroelastic deposits. These are used together with responsive aeroelastic bearing surfaces 430, 432, and 438 and recessed surfaces 434 and 436 in one embodiment, so that the pattern of air compression from a given step surface to the following bearing surface remains similar as both surfaces expand together. In another embodiment, responsive aeroelastic step surfaces 440, 442, 444, 446, 447 and 449 are used together with traditional bearing surfaces with a lesser or insignificant coefficient of expansion responsive to the stimulus, so that the partial, transition pressurizing performed by a step surface increases as the step surface expands relative to the bearing surface, leaving less additional compression that the bearing surface performs. This variation in the pattern of differential pressurization relative to the stimulus has its own advantageous properties in optimizing the hydrodynamic properties of slider 410 to its application.

Cavity floors 450, 452, 454, 456, and 458 are each disposed for an air flow to pass over them before encountering a corresponding step surface and then bearing surface. In each case, the air flow is also guided on this path by channel walls, to prevent the air flow from spilling laterally and instead restrict the air flow to two-dimensional motion in the longitudinal and vertical directions. That is, the lateral direction runs substantially parallel to leading surface 422 and trailing surface 424, while the longitudinal direction runs substantially parallel to side surfaces 426 and 428, and the vertical direction is directed substantially perpendicular to and out of the page, in the perspective of FIG. 5. Cavity floors 450, 452, 454, 456, and/or 458 are composed of traditional substrate in one embodiment, having a coefficient of expansion responsive to the stimulus that is little or negligible. In other embodiments, any of cavity floors 450, 452, 454, 456, and/or 458 are composed of responsive aeroelastic deposits, which have a significantly larger coefficient of expansion relative to the stimulus than the surrounding substrate features. These may be used in conjunction either with traditional substrate or responsive aeroelastic step surfaces and bearing surfaces. Again, this offers advantages in some applications by modifying, responsively to the stimulus, the pattern of differential pressurization of the slider 410.

While step surfaces 440, 442, 444, 446, 447 and 449 and cavity floors 450, 452, 454, 456, 457, 458 and 459 are depicted as substantially flat in the present embodiment, there are alternative embodiments in which any or all of them are tapered or otherwise have a depth that varies from one portion of an individual surface to another.

Debris shield 460, disposed along the leading surface 422, is a feature of hydrodynamic surface 420 the primary purpose of which is not hydrodynamic. Rather, debris shield 460 protects hydrodynamic surface 420 from incoming contaminant particles during nominal flight of slider 410. Debris shield 460 may also be composed of a responsive aeroelastic deposit in some embodiments. This provides the advantage, for instance, when used in tandem with responsive aeroelastic deposit bearing surfaces, to remain level with those bearing surfaces and thereby continue to protect hydrodynamic surface 420 from contaminant particles as the aeroelastic bearing surfaces respond to the stimulus.

Figure 6:
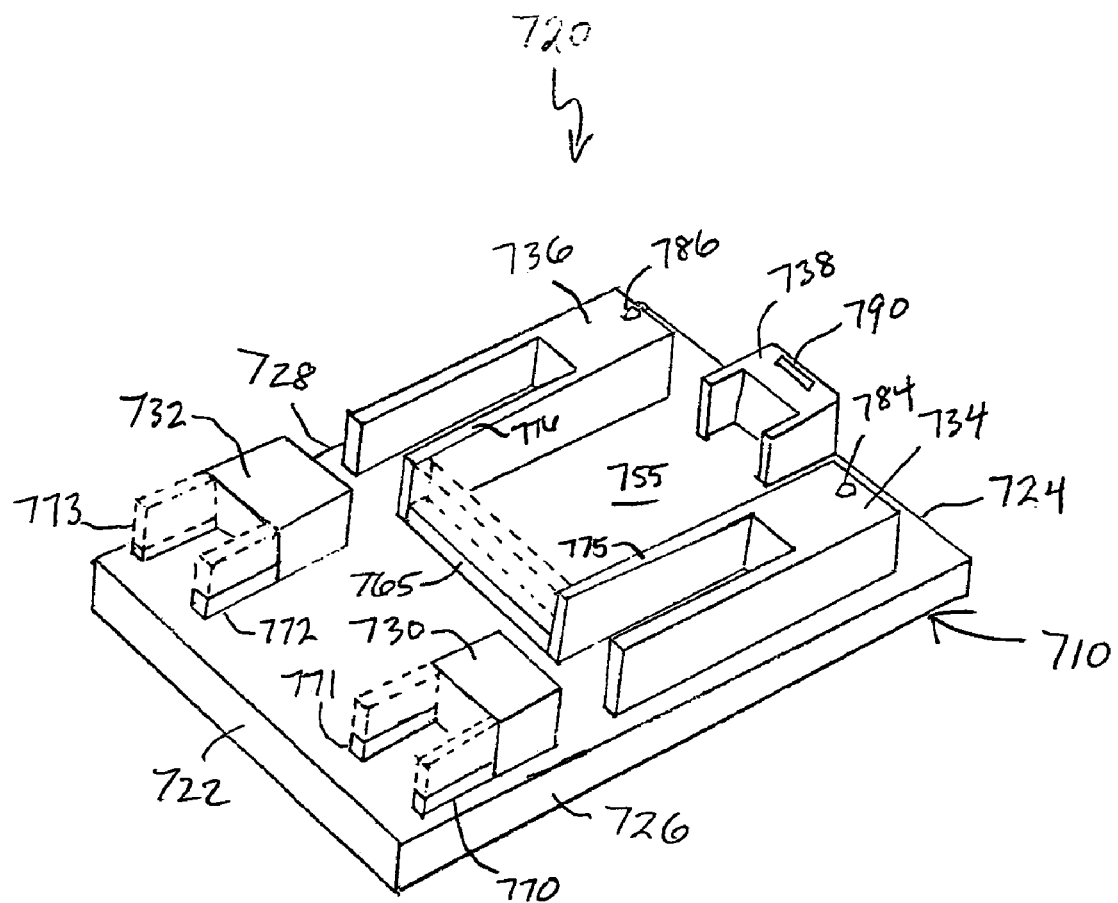
FIG. 6 depicts a perspective view of a slider including a responsive aeroelastic deposit, according to one embodiment.
Figure 7:
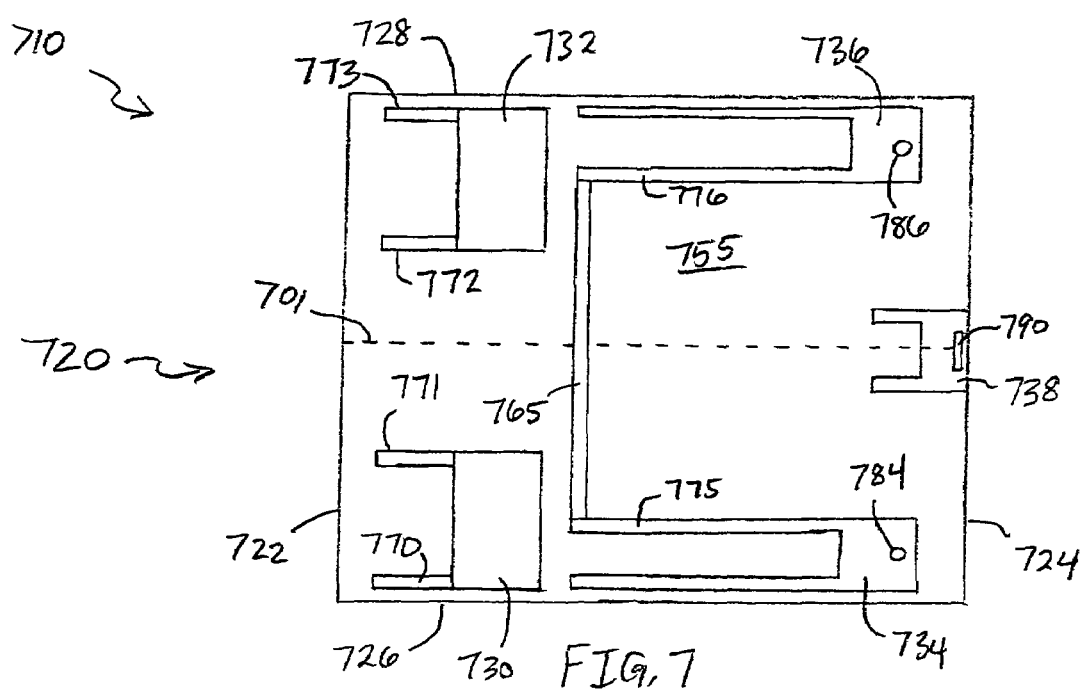
FIG. 7 depicts a top plan view of the hydrodynamic surface of a slider, according to one embodiment.

FIGS. 6 and 7 depict another exemplary embodiment with several features illustrative of the present invention. FIG. 6 is a perspective view of a slider 710 of the present invention, according to one embodiment. FIG. 7 is a top plan view of the same embodiment of slider 710. Slider 710 includes hydrodynamic surface 720 and is bounded by leading surface 722, trailing surface 724, and side surfaces 726 and 728. Hydrodynamic surface 720 includes leading bearing surfaces 730 and 732, and trailing bearing surfaces 734, 736, and 738. Bearing surface 738 is disposed near the center of the trailing surface 724, while the other four bearing surfaces 730, 732, 734, 736 form two pairs of side bearing surfaces opposing each other across a longitudinal centerline 701 of hydrodynamic surface 720.

Bearing surface 730 has two channel walls 770, 771 associated with it, extending from bearing surface 730 toward leading surface 722. Channel walls 770, 771 are composed of responsive aeroelastic deposits, having an appreciable coefficient of expansion responsive to the relevant stimulus. Channel walls 770, 771 are depicted in the perspective view of FIG. 6 both in bold lines to indicate an unexpanded, default state, when the stimulus is in a default mode; and in dashed lines to indicate an expanded state with increased height, when the stimulus is exerted above its default mode.

Bearing surface 732 also has two channel walls 772, 773 associated with it, extending from bearing surface 732 toward leading surface 722. Channel walls 772, 773 are likewise composed of responsive aeroelastic deposits, having an appreciable coefficient of expansion responsive to the relevant stimulus. Channel walls 772, 773 are depicted in the perspective view of FIG. 6 both in bold lines to indicate an unexpanded, default state, when the stimulus is in a default mode; and in dashed lines to indicate an expanded state with increased height, when the stimulus is exerted above its default mode, in the same manner as channel walls 770, 771.

The distinction made here between default mode and exerted mode of the stimulus follows the nominal operating parameters of the application. In embodiments in which the relevant stimulus is an electric voltage, a magnetic field, or electromagnetic radiation, for example, the default mode includes zero applied stimulus, with possibly trace levels, if any, of the stimulus present in the ambient environment. In embodiments in which the relevant stimulus is heat or humidity, for example, the default mode would be defined by nominal design parameters for the application, and may include, for instance, room temperature.

In this embodiment, therefore, the forward bearing surfaces 730, 732 themselves are not composed of responsive aeroelastic deposits, but their differential pressurization characteristics are nevertheless responsive to the relevant stimulus, due to the responsive aeroelastic expansion of their associated channel walls 770, 771, 772, 773 respectively. As the stimulus rises, the channel walls also expand, increasing their height relative to the surrounding hydrodynamic surface 720, and restricting the air flow within their domains to provide a more assured flow of air longitudinally and vertically to converge over bearing surfaces 730, 732.

Cavity dam 765 is also composed of a responsive aeroelastic deposit, having a substantial coefficient of expansion responsive to the relevant stimulus, in this embodiment. The default state of cavity dam 765 is depicted in solid lines, while a substantially expanded state of cavity dam 765 is depicted in dashed lines, corresponding to having expanded responsively to the stimulus. When cavity dam 765 expands, the effect of sub-ambient pressurization increases in the region of cavity surface 755, where the air flow passing over cavity dam 765 goes. This increase in the sub-ambient pressurization effect acts to decrease the fly height and increase the pitch stiffness of slider 710. Such an increased sub-ambient pressurization around cavity surface 755 has advantages in many embodiments, such as to correlate an increase in pitch stiffness with a rise in temperature, for example. In another embodiment, the cavity walls 775, 776 are also RAD, increasing the effectiveness of the sub-ambient pressurization at cavity floor 755. Cavity walls 775, 776 also serve as channel walls for air flow passing to bearing surfaces 734, 736, respectively, in this embodiment. The expansion of channel walls 775, 776 acts to increase the above-ambient pressurization effect of bearing surfaces 734, 736 respectively. This demonstrates that both sub-ambient pressurization features and above-ambient pressurization features may both be increased responsively to the relevant stimulus in a single embodiment.

Hydrodynamic surface 720 also includes landing pads 784; 786, structures intended primarily not to influence the hydrodynamics of slider 710, but to provide relatively safe contact points in the event of a "landing" or contact between slider 710 and an opposing surface 110. Landing pad 784 is disposed on bearing surface 734, while landing pad 786 is disposed on bearing surface 736. Landing pads 784, 786 are composed of both a responsive aeroelastic deposit, and a coating of diamond-like carbon (DLC), a particularly hard and durable material, in this embodiment. Other materials similarly suited for protecting hydrodynamic surface 720 are included in other embodiments.

In this embodiment, the responsive expansion of the landing pads 784, 786 relative to the stimulus provides additional advantages. For example, the system 100 incorporating slider 710 senses an above-nominal level of mechanical vibrations and disturbances, such as might introduce added uncertainty in roll stability of slider 710. System 100 reacts by signaling the stimulus to engage, such as in the form of an electric voltage, magnetic field, electromagnetic radiation, etc. The stimulus thus engaged causes the RAD landing pads 784, 786 to expand responsively, and raise the clearance they provide above the surrounding bearing surfaces 734, 736, respectively. This is an example of RAD landing pads acting as an effective method of compensating and providing added protection for the temporary, added roll uncertainty.

Magnetic transducer tip 790 is disposed upon center trailing bearing surface 738. Transducer tip 790 is a particular embodiment of a transducer, appropriate for this embodiment. Transducer tip 790 is typically exposed to significant levels of heat during nominal operation, including due to electrical current passing through it. In one embodiment corresponding to the geometry depicted in FIGS. 6 and 7, the RAD-relevant stimulus is heat. The RAD features have a greater coefficient of thermal expansion than the coefficient of thermal expansion of the transducer tip 790, in this embodiment, wherein a coefficient of thermal expansion is the specifically applied coefficient of expansion responsive to the particular stimulus of heat. When slider 710 is exposed to heat, the aeroelastic features expand responsively to the stimulus at a greater rate than transducer tip 790. In this embodiment, the expansion of trailing RAD bearing surface 738 causes fly height of slider 710 to increase at a greater rate than the rate at which the height of RAD bearing surface 738 increases. The height of the aeroelastic features, such as cavity dam 765, above the surrounding hydrodynamic surface 720, thereby increases at a greater rate than the increase in the height of the transducer tip 790. While the substrate composing much of hydrodynamic surface 720 also has some finite coefficient of expansion responsive to the stimulus of heat, it is much less than that of the aeroelastic features such as cavity dam 765, such that it is of marginal significance or is negligible relative to the coefficient of responsive expansion of the aeroelastic features, as well perhaps as transducer tip 790.

Figure 8:
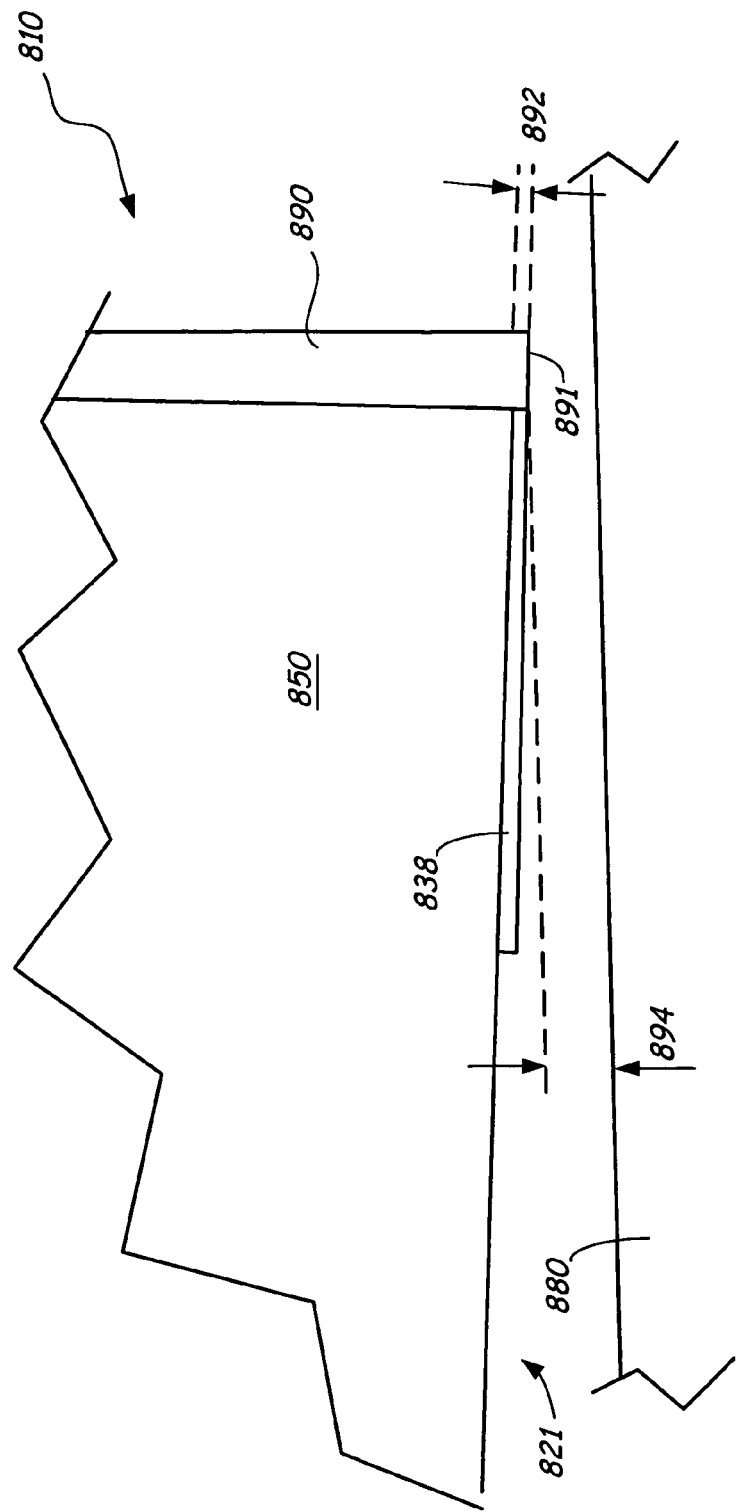
FIG. 8 depicts a close-up side lateral view of a slider suspended above an media surface, according to one embodiment.
Figure 9:
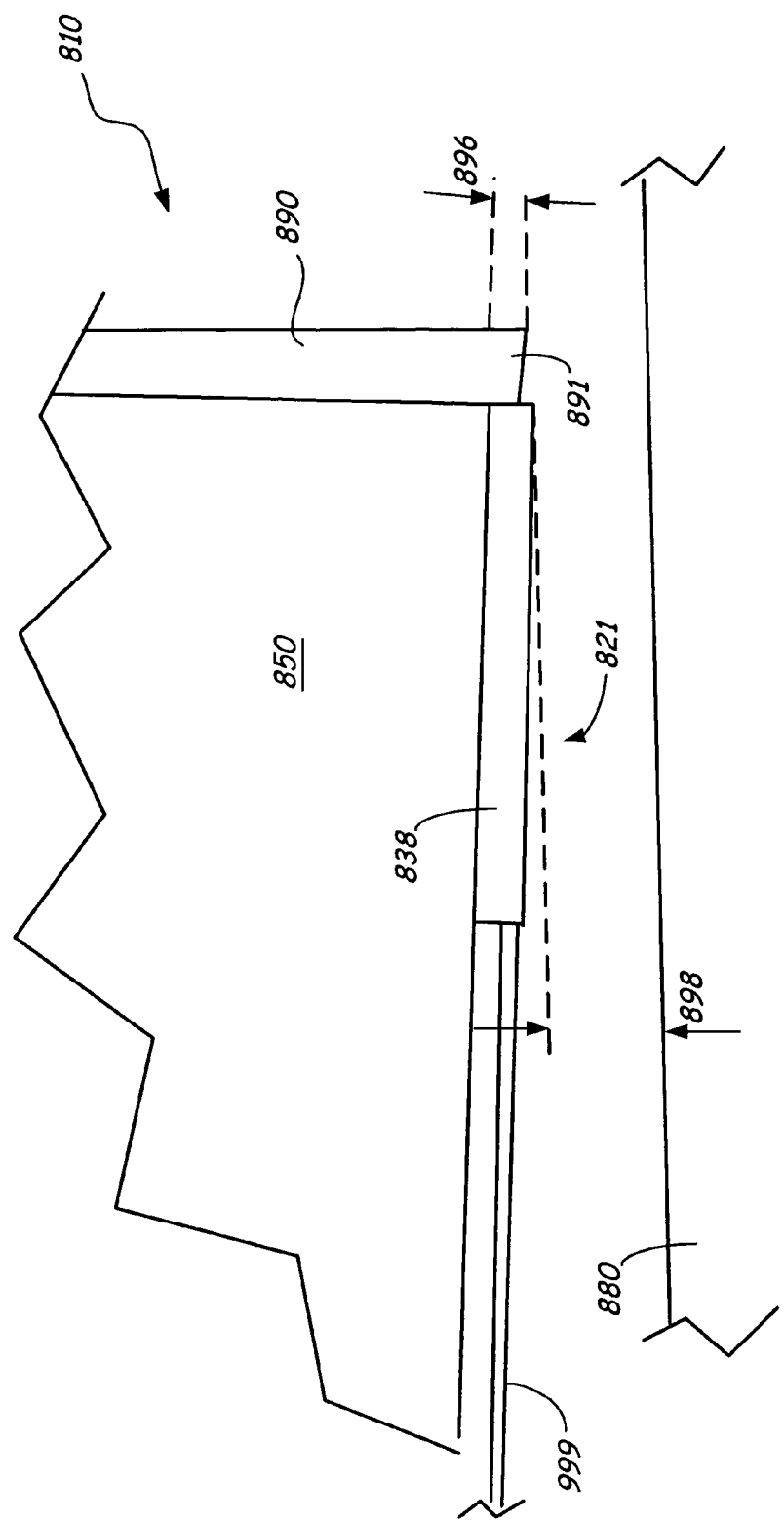
FIG. 9 depicts a close-up side lateral view of a slider suspended above an media surface, according to one embodiment.

FIG. 8 and FIG. 9 are side lateral views illustrating an embodiment in which a slider 810 is suspended from a head assembly (not depicted) above a media surface 880, within a data storage system similar to data storage system 100 depicted in FIG. 3. Slider 810 includes substrate 850, transducer 890 which includes transducer tip 891, and hydrodynamic surface 821 which includes responsive aerodynamic deposit 838. Slider fly height 894 is depicted, defined as the displacement between the slider 810 and the media surface 880. Transducer tip height 892 is also depicted, defined as the extension of transducer tip 891 from the plane of the substrate 850. Transducer tip 891 and responsive aerodynamic deposit 838 are relatively not significantly extended in FIG. 8, indicating a low level of the relevant stimulus to which their coefficient of expansion is intended.

FIG. 9 depicts the embodiment of FIG. 8 being exposed to laser beam 999, directed toward responsive aerodynamic deposit 838, from a direction substantially axially parallel to the support axis of the head assembly (not depicted), consistent with a mirror associated with the support structure being used to direct the laser beam 999 at the responsive aerodynamic deposit 838. Slider 810 is also active in writing and reading information through transducer tip 891 to and from media surface 880, generating a significant level of heat in transducer tip 891 and transducer 890. The relevant stimulus for this embodiment, responsively to which the coefficient of expansion of the responsive aerodynamic deposit 838 (as well as of the transducer tip 891) is greater than the coefficient of expansion of the substrate, includes heat. The relevant stimulus also includes electromagnetic radiation in this embodiment, particularly in the form of locally generated laser beam 999. This may be due either to the responsiveness of the responsive aerodynamic deposit 838 to thermal expansion, to photostrictive expansion, or a combination of the two. Because a relevant stimulus of an embodiment includes one specific form of stimulus does not exclude it from including other forms of stimulus as well, so that the slider components may have a coefficient of expansion that is responsive to a combination of factors, arising either unavoidably or intentionally. Due to the responsive expansion of responsive aeroelastic deposit 838 and transducer tip 896, the slider fly height 898 and transducer tip height 896 have both increased at a substantially similar rate, in this embodiment. Other relative coefficients of expansion responsive to various relevant stimuli, and other relative rates of expansion, are to be found in other embodiments.

Figure 10:
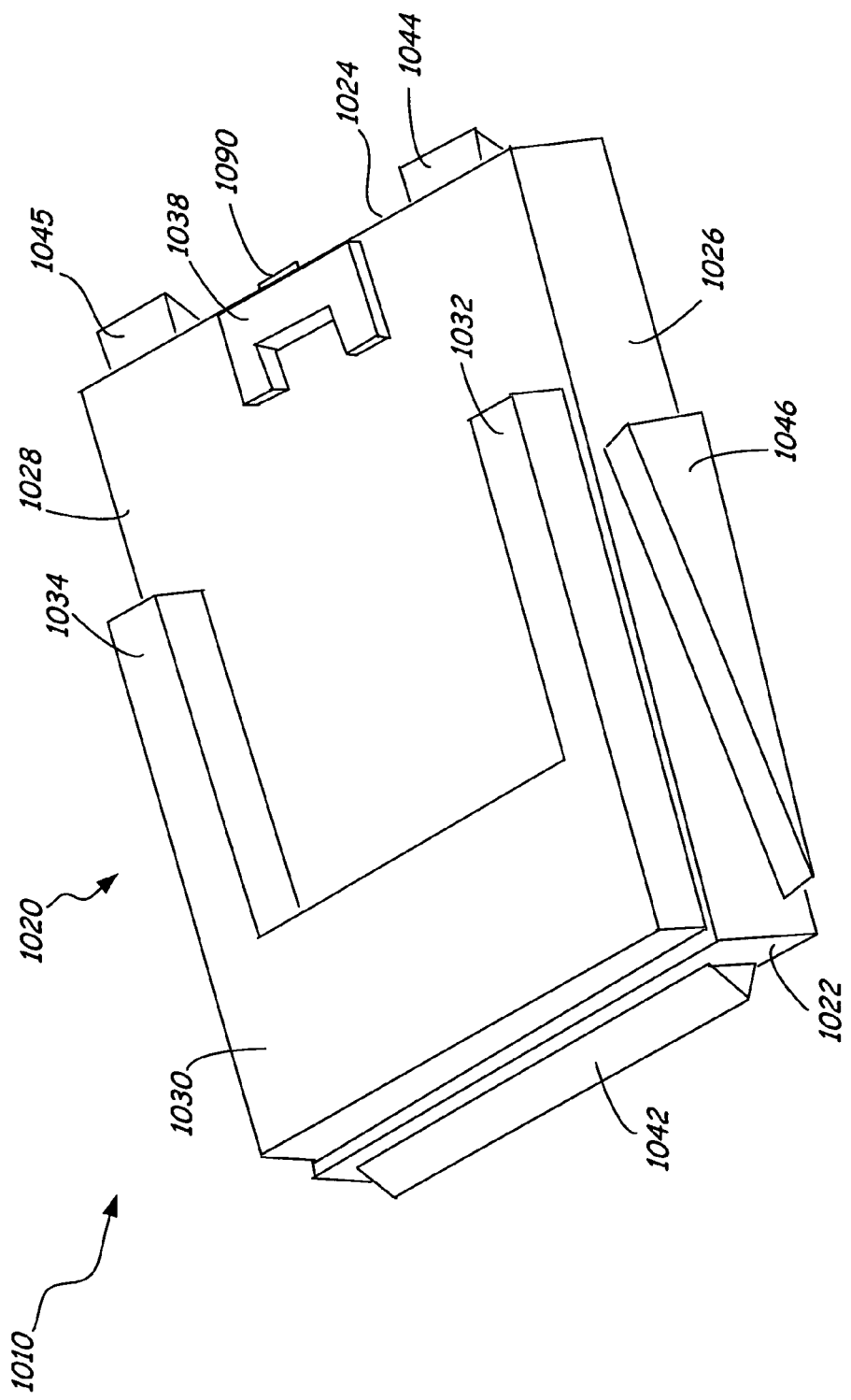
FIG. 10 depicts a perspective view of a slider including several responsive aeroelastic deposits, according to one embodiment.

FIG. 10 depicts slider 1010 as another embodiment. Slider 1010 includes leading hydrodynamic surface 1022, trailing hydrodynamic surface 1024, and side hydrodynamic surfaces 1026 and 1028. Hydrodynamic surface 1020 includes leading bearing surface 1030, from which side arms 1032 and 1034 extend toward the trailing surface 1024. Hydrodynamic surface 1020 also includes a responsive aeroelastic deposit (RAD) bearing surface 1038 near trailing surface 1024, adjacent to which transducer tip 1090 is disposed. Slider 1010 also includes responsive aeroelastic deposit 1042 on its leading surface 1022; responsive aeroelastic deposit 1046 on a side surface 1026 (and a matching responsive aeroelastic deposit, obscured from view, on opposing side surface 1028); and responsive aeroelastic deposits 1044 and 1045 on trailing surface 1024. Responsive aeroelastic deposits 1042, 1044, 1045 and 1046 are additional examples of responsive aeroelastic deposits that contribute to controlling pitch, roll and lift in slider 1010 as another illustrative embodiment. Many other arrangements, geometries, and patterns of responsively aeroelastic morphologies may occur in other embodiments.

The present invention therefore includes unexpected and novel advantages as detailed herein and as can be further appreciated from the claims, figures, and description, by those skilled in the art. Although particular embodiments are described in reference to a disc drive as a particular form of data storage system, the present invention has various other embodiments with application to other data storage systems involving media including magnetic, magnetoresistive, optical, mechanical, and other data technologies, in disc, tape, floppy, and other mechanical formats. Similarly, in other embodiments a substrate or slider is disposed opposite a surface other than a media surface and/or has a fly height defined in terms other than those of a transducer, wherein other reasons prevail for an optimized fly height of the slider above the opposing surface to be desired, and wherein the present invention is also useful in providing advanced air bearing properties for pitch, roll, and vertical height.

As another example, several embodiments are depicted and described herein in which the expansion responsive to the stimulus is a vertical linear expansion acting chiefly to raise or lower the height of the responsive aeroelastic deposit relative to the surrounding portions of the hydrodynamic surface. In other embodiments, other modes of mechanical reaction occur in the RAD, including shear and bending, for example, in addition to vertical expansion.

As another example, certain embodiments are depicted and described herein in which surfaces of the hydrodynamic surface are set at a bearing height, a step depth, a cavity depth, etc. In other embodiments, portions of the hydrodynamic surface occur at any number of different depths, and include not only flat surfaces but curved, tapered, sloped, dimpled, textured, and otherwise uneven surfaces.

As another example, while many references are made to air and air flow, it is understood that this refers to any applicable fluid for which a particular embodiment is designed, including either atmospheric air or a more refined fluid such as argon, helium, nitrogen, carbon dioxide, or some other fluid.

As yet another example, RAD surfaces responsive to different stimuli may be combined in one slider, and a single RAD feature may include a variety of different RADs, thereby being made simultaneously responsive to a variety of different relevant stimuli. For example, a single trailing bearing surface may include deposits with a relatively high coefficient of thermal expansion, as well as a relatively high coefficient of expansion responsive to the stimulus of electromagnetic radiation of an ultraviolet frequency, thereby expanding responsively to both heat and ultraviolet radiation, with its total expansion a function of both these relevant stimuli.

As still another example, a slider may have a hydrodynamic surface with a RAD on more than one face of the slider. For instance, in one illustrative embodiment, a slider includes hydrodynamic surfaces including responsive aeroelastic deposits on a surface facing an opposing media surface, as well as on its leading edge surface, and on its two side edge surfaces.

It is to be understood that even though numerous characteristics, advantages, structures and functions of various illustrative embodiments of the invention have been set forth in the foregoing description, this disclosure is illustrative only. Changes may be made in detail, especially in matters of structure and arrangement of parts within the principles of the present invention, to the full extent indicated by the broad, general meaning of the terms in which the appended claims are expressed.

It will be appreciated by those skilled in the art that the teachings of the present invention can be applied to a family of systems, devices, and means encompassed by and equivalent to the examples of embodiments described, without departing from the scope and spirit of the present invention. Further, still other applications for the sliders of the present invention are possible.

What is claimed is:

1. A slider, comprising:
   a substrate, having a first coefficient of expansion responsive to a stimulus;
   a transducer disposed on the substrate, the transducer having a second coefficient of expansion responsive to the stimulus that is greater than the first coefficient of expansion; and
   a hydrodynamic surface comprising at least a portion of a bearing surface and a responsive aeroelastic deposit having a third coefficient of expansion responsive to the stimulus that is greater than the first coefficient of expansion;
   wherein the responsive aeroelastic deposit comprises at least a portion of a convergent channel.

2. The slider of claim 1, wherein a height of the responsive aeroelastic deposit above a portion of the hydrodynamic surface increases as the responsive aeroelastic deposit expands responsively to the stimulus.

3. The slider of claim 1, wherein the responsive aeroelastic deposit shears as it expands responsively to the stimulus.

4. The slider of claim 1, wherein the responsive aeroelastic deposit bends as it expands responsively to the stimulus.

5. The slider of claim 1, wherein the stimulus comprises heat.

6. The slider of claim 1, wherein the stimulus comprises an electric voltage or an electric current.

7. The slider of claim 1, wherein the stimulus comprises a magnetic field.

8. The slider of claim 1, wherein the stimulus comprises electromagnetic radiation.

9. The slider of claim 1, wherein the stimulus comprises humidity.

10. The slider of claim 1, wherein the responsive aeroelastic deposit comprises at least a portion of an above-ambient pressure formation.

11. The slider of claim 1, wherein the responsive aeroelastic deposit comprises at least a portion of a cavity wall.

12. The slider of claim 1, wherein the responsive aeroelastic deposit comprises at least a portion of a sub-ambient pressure formation.

13. The slider of claim 1, wherein the responsive aeroelastic deposit is comprised on at least a portion of a cavity surface of the slider.

14. The slider of claim 1, wherein the responsive aeroelastic deposit is comprised on at least a portion of a bearing surface of the slider.

15. The slider of claim 1, wherein the third coefficient of expansion is less than the second coefficient of expansion.

16. The slider of claim 1, wherein at least a portion of the responsive aeroelastic deposit is disposed adjacent to the transducer to form a convergent channel, comprising a cavity surface comprising the responsive aeroelastic deposit, and a channel wall comprising the transducer.

17. The slider of claim 1, wherein the responsive aeroelastic deposit comprises at least a portion of a debris shield.

18. The slider of claim 1, wherein the responsive aeroelastic deposit comprises at least a portion of a landing pad.

19. The slider of claim 1, wherein at least a portion of the responsive aeroelastic deposit has a shape and position on the hydrodynamic surface such that an expansion of the responsive aeroelastic deposit causes a roll of the slider to increase.

20. The slider of claim 1, wherein at least a portion of the responsive aeroelastic deposit has a shape and position on the hycirodynamic surface such that expansion of the responsive aeroelastic deposit causes a pitch of the slider to increase.

21. The slider of claim 1, wherein at least a portion of the responsive aeroelastic deposit has a shape and position on the hydrodynamic surface such that expansion of the responsive aeroelastic deposit causes a lift of the slider to increase.

22. The slider of claim 21,
wherein the slider faces an opposing surface defining a fly height of the slider measured from the opposing surface to the transducer; and
wherein at least a portion of the responsive aeroelastic deposit has a shape and position on the hydrodynamic surface such that expansion of the deposit toward the opposing surface causes the fly height of the slider to increase.

23. A slider, comprising:
a substrate, having a first coefficient of expansion responsive to a stimulus;
a transducer disposed on the substrate, the transducer having a second coefficient of expansion responsive to the stimulus that is greater than the first coefficient of expansion; and
a hydrodynamic surface comprising at least a portion of a bearing surface and a responsive aeroelastic deposit having a third coefficient of expansion responsive to the stimulus that is greater than the first coefficient of expansion;
wherein the responsive aeroelastic deposit comprises at least a portion of a channel wall.

24. The slider of claim 23, wherein a height of the responsive aeroelastic deposit above a portion of the hydrodynamic surface increases as the responsive aeroelastic deposit expands responsively to the stimulus.

25. The slider of claim 23, wherein the stimulus comprises heat.

26. The slider of claim 23, wherein the stimulus comprises an electric voltage or an electric current.

27. The slider of claim 23, wherein the stimulus comprises a magnetic field.

28. The slider of claim 23, wherein the stimulus comprises humidity.

29. A slider, comprising:
a substrate, having a first coefficient of expansion responsive to a stimulus;
a transducer disposed on the substrate, the transducer having a second coefficient of expansion responsive to the stimulus that is greater than the first coefficient of expansion; and
a hydrodynamic surface comprising at least a portion of a bearing surface and a responsive aeroelastic deposit having a third coefficient of expansion responsive to the stimulus that is greater than the first coefficient of expansion;
wherein the responsive aeroelastic deposit comprises at least a portion of a cavity dam.

30. The slider of claim 29, wherein a height of the responsive aeroelastic deposit above a portion of the hydrodynamic surface increases as the responsive aeroelastic deposit expands responsively to the stimulus.

31. The slider of claim 29, wherein the stimulus comprises heat.

32. The slider of claim 29, wherein the stimulus comprises an electric voltage or an electric current.

33. The slider of claim 29, wherein the stimulus comprises a magnetic field.

34. The slider of claim 29, wherein the stimulus comprises humidity.

35. The slider of claim 29, wherein the responsive aeroelastic deposit comprises at least a portion of a debris shield.

36. A slider, comprising:
a substrate. having a first coefficient of expansion responsive to a stimulus;
a transducer disposed on the substrate, the transducer having a second coefficient of expansion responsive to the stimulus that is greater than the first coefficient of expansion; and
a hydrodynamic surface comprising at least a portion of a bearing surface and a responsive aeroelastic deposit having a third coefficient of expansion responsive to the stimulus that is greater than the first coefficient of expansion;
wherein the responsive aeroelastic deposit is adjacent to at least a portion of a leading surface of the slider.

37. The slider of claim 36, wherein the responsive aeroelastic deposit is adjacent to at least a portion of a side surface of the slider.

38. The slider of claim 36, wherein the responsive aeroelastic deposit is adjacent to at least a portion of a trailing surface of the slider.

* * * * *

UNITED STATES PATENT AND TRADEMARK OFFICE
CERTIFICATE OF CORRECTION

PATENT NO. : 7,262,937 B2 Page 1 of 1
APPLICATION NO. : 10/797162
DATED : August 28, 2007
INVENTOR(S) : John R. Pendray et al.

It is certified that error appears in the above-identified patent and that said Letters Patent is hereby corrected as shown below:

Col. 21, line 28, change "hycirodynamic" to --hydrodynamic--.

Col. 22, line 39, change "." to --,--.

Signed and Sealed this

Sixth Day of November, 2007

JON W. DUDAS
*Director of the United States Patent and Trademark Office*